United States Patent [19]

Kim

[11] Patent Number: 5,510,210
[45] Date of Patent: Apr. 23, 1996

[54] SOLID ELECTROLYTE FOR SODIUM-SULFUR SECONDARY CELL AND PROCESS FOR PREPARING THE SAME

[75] Inventor: Young-shol Kim, Kyungki-do, Rep. of Korea

[73] Assignee: Yukong Limited, Rep. of Korea

[21] Appl. No.: 331,763

[22] Filed: Oct. 31, 1994

[30] Foreign Application Priority Data

Nov. 9, 1993 [KR] Rep. of Korea .................. 1993-23702

[51] Int. Cl.$^6$ ........................................................ H01M 6/18
[52] U.S. Cl. .............................. 429/193; 501/41; 501/119; 501/153
[58] Field of Search ........................... 429/193; 252/622; 501/41, 118, 119, 120, 153

[56] References Cited

U.S. PATENT DOCUMENTS

| | | | |
|---|---|---|---|
| 3,950,463 | 4/1976 | Jones | 429/193 |
| 4,381,968 | 5/1983 | Singh | 429/193 |
| 4,491,392 | 1/1985 | Elmer et al. | 350/357 |
| 4,539,276 | 9/1985 | Harbach | 429/191 |
| 5,229,340 | 7/1993 | Nemoto et al. | 501/153 |

*Primary Examiner*—Kathryn Gorgos
*Attorney, Agent, or Firm*—Seidel Gonda Lavorgna & Monaco

[57] ABSTRACT

The present invention is directed to a solid electrolyte and a process for making the same for a sodium-sulfur secondary cell including a composition of 7.0 to 10.0 weight percent of $Na_2O$, 0.5 to 3.5 weight percent of MgO or 0.7 to 1.0 weight percent of $Li_2O$, 0.01 to 0.6 weight percent of $WO_3$, and the balance of $Al_2O_3$. The solid electrolyte is prepared by mixing $Na_2O$, MgO, $Li_2O$, $WO_3$, and $Al_2O_3$, calcining the resulting mixture, pulverizing the calcined body, and subjecting the resulting powders to sintering. Alternatively, the solid electrolyte is prepared by mixing $Na_2O$, MgO, or $Li_2O$, and $Al_2O_3$ with one another, calcining the mixture, adding $WO_3$ to the calcined body, pulverizing the resulting material, and subjecting the resulting powders to sintering.

2 Claims, 3 Drawing Sheets

SOLID ELECTROLYTE FOR SODIUM-SULFUR SECONDARY CELL AND PROCESS FOR PREPARING THE SAME

BACKGROUND OF THE INVENTION

1. Field of the invention

The present invention relates, in general, to a solid electrolyte for sodium-sulfur secondary cell and, more particularly, to a solid electrolyte of beta alumina and/or β" alumina useful for a sodium-sulfur secondary cell, a sensor or a thermal pumping apparatus. Also, the present invention is concerned with a process for the preparation of solid electrolyte.

2. Description of the Prior Art

Since 1970, research and development efforts have been directed to sodium-sulfur secondary cells because they are superior to existing lead storage batteries in energy density and power density to weight in the order of two-fold. Sodium-sulfur secondary cells may be useful for drive devices utilizing electricity, such as electrical mobiles and the like, and may be adapted to electrical cells for storing power.

Usually, in sodium-sulfur secondary cells, a sintered body of beta alumina and/or β" alumina, which selectively penetrates only sodium ions at 350° C. without electron conductivity, is employed as a solid electrolyte. A sodium-sulfur secondary cell is manufactured by contacting metallic sodium with one surface of the electrolyte of beta alumina and/or β" alumina with the other surface coming into contact with molten sulfur. Upon operating the sodium-sulfur secondary cell, the metallic sodium is ionized to allow current to flow through a current conduction body of metal, and then, the sodium ions move through the electrolyte into a place of molten sulfur and react with the molten sulfur, to produce compounds of formula $Na_2S_x$ wherein x is between 2.7 and 5.0. The current obtained through such reaction mechanism is utilized to drive the electrical apparatuses.

Sodium-sulfur secondary cells, on the other hand, can be recharged. For example, if current is forced to flow in the reverse direction, the sodium polysulfur compounds are decomposed into molten sulfur and sodium ions which then move through the electrolyte into their own original place and are reduced into metallic sodium thereat.

In addition, sodium-sulfur secondary cells should be discharged still molten sulfur is reacted with the sodium ions to produce up to $Na_2S_3$. Over-discharge of sodium-sulfur secondary cells produces $Na_2S_2$ and/or $Na_2S$ therein, which compounds are precipitated at a temperature of 300° to 350° C., incapacitating selective separation of the sodium ions upon recharging. The sodium-sulfur secondary cells, therefore, come to be largely lowered in capability. This phenomenon, called "deep discharge", is a cause of reducing the life of the sodium-sulfur secondary cell.

In addition, it is required that both the charging rate and the discharging in sodium-sulfur secondary cell be not more than the critical current density of the beta alumina and/or β" alumina. Herein, the critical current density means the largest amount of current per unit area of electrolyte at which the electrolyte is not broken down in a variable of an electrolytic process.

Since most, e.g. about 70% of the total inner resistance generated in a secondary cell using beta alumina and/or β" alumina, such as sodium-sulfur secondary cell, is attributed to the solid electrolyte, it is important to reduce the resistance caused by the solid electrolyte. In addition, since mechanical strength of the solid electrolyte largely determines the life of sodium-sulfur secondary cell, it is preferred to prepare a sintered body of the solid electrolyte with higher mechanical strength.

Generally, β" alumina is superior to beta alumina in both Na ion conductivity and mechanical strength. So, rather than beta alumina, there is applied β" alumina, which can be prepared by adding $Li_2O$ and MgO to a beta alumina composition, to the sodium-sulfur secondary cell as a solid electrolyte for use in insulating metallic sodium as a cathode active material and molten sulfur as an anode active material.

For the solid electrolyte of sodium-sulfur secondary cell, the beta alumina and/or β" alumina is necessary to be sintered. At 350° C., the sintered body of beta alumina and/or β" alumina preferably has an ion conductivity of about 3.0 Ω·cm and a mechanical strength of about 170 MPa. However, the sintered body of beta alumina and/or β" alumina has a disadvantage in that its optimum sintering temperature range is very narrow. When mass production in a batch type manner, the sintered body may be prepared at a variety of temperature because a large scale furnace, a sintering facility, has different temperatures according to its inner places. Owing to this, the prepared sintered body comes to have not uniform but variable properties.

Many an effort has been made to overcome the above problems. For example, after measuring practical temperature distribution in the furnace of which the inner temperature is fixed by a temperature controller, a composition most suitable to the temperature distribution is sintered therein. In this case, one sintering process may be enough for the sintered body of beta alumina and/or β" alumina with the above preferred properties, allowing high production yield.

In addition, research and development efforts have been directed to additives which give the electrolyte better properties. For example, $ZrO_2$ is described in Japanese Patent Laid-Open Publication No. Sho. 59-141459 while $TiO_2$ in Japanese Patent Laid-Open No. Heisei 3-279258. It is written in European Patent No. 495652 that addition of $SnO_2$ mitigates the affects caused by the variable sintering temperature. In addition to those quadrivalent positive ion oxides, quinquevalent positive ion oxides, such as $Nb_2O_5$ and $Ta_2O_5$, are disclosed in European Patent No. 471523.

However, the additives suggested in the supra patents cause some problems in a final sintered body. For example, $ZrO_2$ wants to increase the sintering temperature according to its amount. In case of $TiO_2$, Ti ions are unstable in atomic valence and are highly apt to be reduced, so that ion conductivity of the electrolyte is deteriorated. Further, it is difficult to control the properties of the sintered body of beta alumina and/or β" alumina with $SnO_2$ because of its strong volatilization at the sintering temperature. The additive $Ta_2O_5$, quinquevalent oxide, is very expensive relative to that used in the present invention.

SUMMARY OF THE INVENTION

It is, therefore, an object of the present invention to provide a solid electrolyte for sodium-sulfur secondary cell, suitable to mass production.

It is another object of the present invention to provide a solid electrolyte for sodium-sulfur secondary cell, superior in electrical and mechanical properties.

It is a further object of the present invention to provide a solid electrolyte for sodium-sulfur secondary cell, capable of being sintered such at a large optimum range as to have good electrical and mechanical properties.

It is still a further object of the present invention to provide a process for preparing the solid electrolyte for sodium-sulfur secondary cell.

In accordance with an aspect of the present invention, there is provided a solid electrolyte for sodium-sulfur secondary cell comprising a composition consisting essentially of 7.0 to 10.0 weight percent of $Na_2O$, 0.5 to 3.5 weight percent of MgO or 0.7 to 1.0 weight percent of $Li_2O$, 0.01 to 0.6 weight percent of $WO_3$, and the balance of $Al_2O_3$.

In accordance with another aspect of the present invention, there is provided a process for preparing a solid electrolyte for sodium-sulfur secondary cell wherein $Na_2O$, MgO or $Li_2O$, and $Al_2O_3$ are mixed with one another, the resulting mixture is calcined and pulverized, and the pulverized body is sintered to obtain the solid electrolyte, comprising the step of adding $WO_3$ on the mixing or subsequent to the calcination.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE INVENTION

The application of the preferred embodiments of the present invention is best understood with reference to the accompanying drawings.

Figure 1:
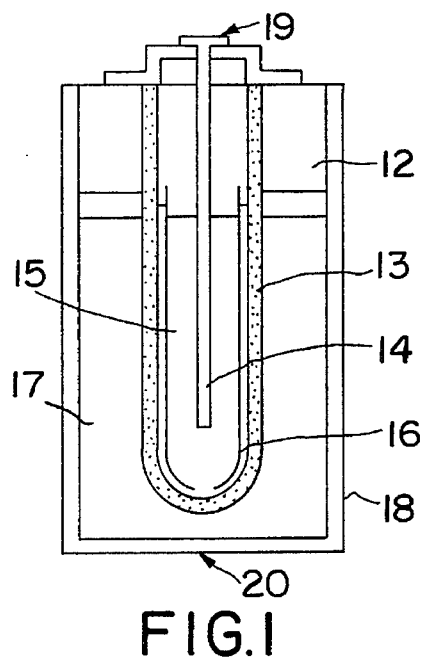
FIG. 1 is a schematic longitudinal sectional view showing a typical sodium-sulfur secondary cell employing a solid electrolyte.

Referring to FIG. 1, there is shown a usual sodium-sulfur secondary cell. As shown in FIG. 1, the sodium-sulfur secondary cell is comprised of an insulator 12, a solid electrolyte 13, a conductive metal tube 16, an anode portion 19 having a conductive metal rod 14, and a cathode portion 20 having a conductive carbon or graphite felt 17 with many pores facilitating fluid penetration. While the anode portion 19 contains a metallic sodium 15, the cathode portion 20 holds a molten sulfur through incorporation in the pores. The conductive metal tube 16 is fixed in the anode portion 19 and prevents violent reaction between the sodium and the sulfur when the solid electrolyte 13 is broken down in the vicinity of the anode portion 19 and/or the cathode portion 20. In addition, the conductive metal tube 16 plays a role of capillary tube for the metallic sodium which dwindles upon discharge. The secondary cell cannot flow current between the anode 19 and the cathode 20 because of the presence of the insulator 12. The above-mentioned parts of the secondary cell are settled on the basis of a metal vessel 18.

In accordance with the present invention, a solid electrolyte for sodium-sulfur secondary cell comprises a composition consisting essentially of about 7.0 to 10.0 w/o of $Na_2O$, about 0.5 to 3.5 weight percent of MgO or about 0.7 to 1.0 weight percent of $Li_2O$, about 0.01 to 0.6 weight percent of $WO_3$ and the balance of $Al_2O_3$.

The reason for limiting chemical compositions of the raw material in the present invention is as follows. If $Na_2O$ is added in an amount less than 7.0 weight percent, β" alumina phase is not completely formed. On the other hand, if the amount of $Na_2O$ exceeds 10.0 weight percent, sodium aluminate is present in a crystal phase of the sintered body, deleteriously affecting properties of the sintered body. Further, too little MgO, that is, below 0.5 weight percent, cannot induce a great quantity of β" alumina phase, so that the conductivity of resulting electrolyte is low. Contrary to this, too much MgO, that is, above 3.5 weight percent, causes a spinel phase in the crystal phase, degrading the mechanical strength of electrolyte. $Li_2O$ shows similar results to those of MgO. Furthermore, when the amount of $WO_3$ is more than 0.6 weight percent, it is extensively dispersed among grain boundaries, and thus the resulting sintered body of beta alumina and/or β" alumina is degraded in both ion conductivity and mechanical strength.

According to the present invention, the above problem on preparation of the conventional solid electrolyte sensitive to the sintering temperature can be solved by adding a small amount of the sixivalent positive ion oxide, $WO_3$.

Now, a description will be made in conjunction of a process for preparing the solid electrolyte.

Figure 2:
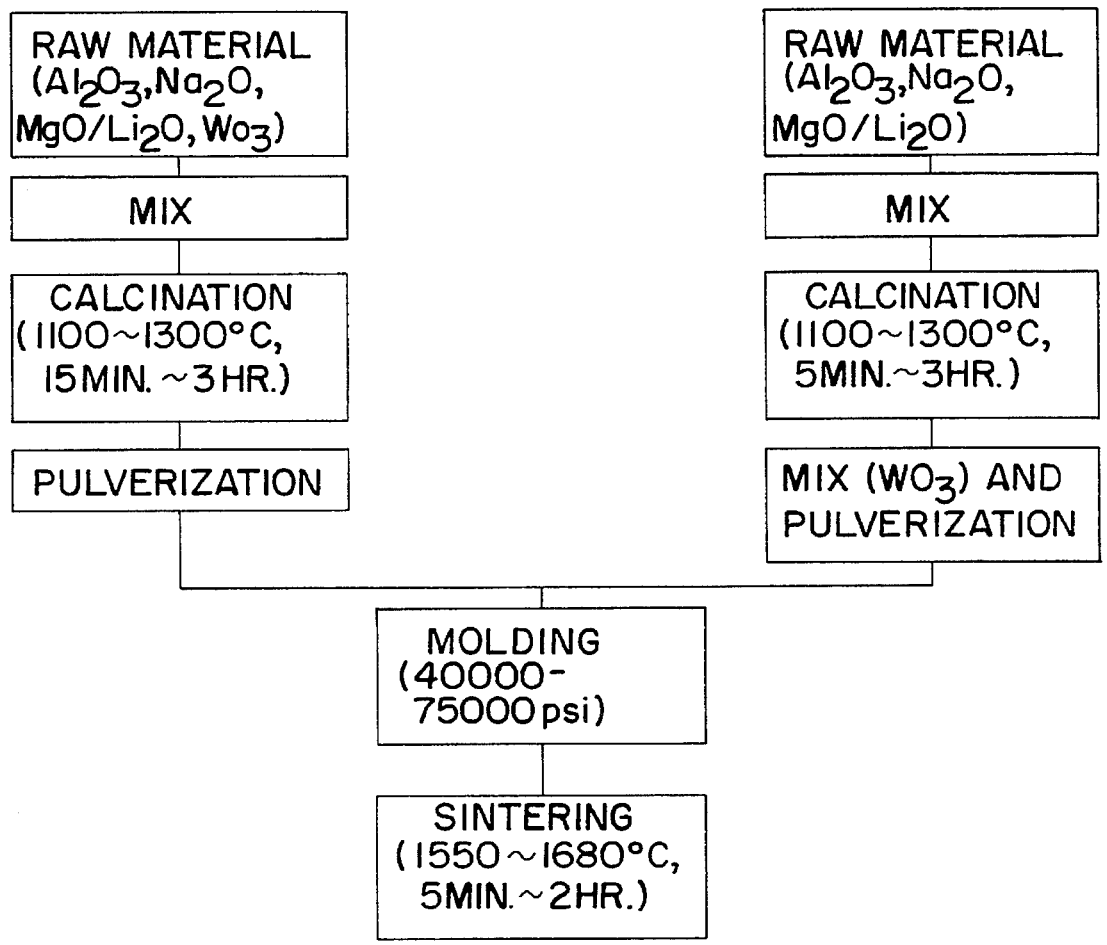
FIG. 2 is a block diagram illustrating preparation processes for solid electrolyte according to the present invention.

Referring to FIG. 2, there are shown two process flows for the preparation of solid electrolyte. As shown in this drawing, there are two paths to the solid electrolyte.

According to a path A, all the raw materials are crushed and mixed in a ball mill with the amounts thereof stated in the above. At the moment, acetone is added along with them. It should be noted that the use of sodium oxide, magnesium oxide, lithium oxide and aluminum oxide may be made of other forms of raw materials, such as carbonate, nitrate, sulfate and chloride. The resulting mixture is subjected to calcination at a temperature of about 1,100° to about 1,300° C. for a period of 15 min. to 3 hours, to obtain beta alumina and/or β" alumina phase. The beta alumina and/or β" alumina thus obtained is pulverized into a powder with a desired size and then molded in a molding frame under a pressure of 40,000 to 75,000 psi by use of a cold isostatic pressure molding machine. Following completion of the molding, the molded body is sintered in a MgO crucible, to prepare a solid electrolyte.

Another path B instructs that all the raw materials but $WO_3$ are crushed and mixed in a ball mill for a predetermined time. Calcination is carried out for the mixture in the same manner as the path A. Thereafter, $WO_3$ is added in the calcined mixture with the amount thereof being in the mentioned range, and the resulting mixture is treated with a powder drier, to control the size of powder. The path B share subsequent steps to the solid electrolyte with the path A.

The preferred embodiments of the present invention will now be further described with reference to specific examples.

EXAMPLES 1, 3, 4, 6, 7, 9, 11, 12 and 13

Aluminum oxide powders, $Na_2O$ powders, MgO or $Li_2O$ powders, and $WO_3$ powders were mixed with one another to obtain raw material powders having a composition shown in the following Table 1. Subsequently, the raw material powders were crushed in a ball mill for 5 hours by using acetone with the volume ratio of the raw material powders to acetone to the ball being 1:1:1, and the crushed raw material powders were calcined at a temperature of 1,100° to 1,300° C. for about 2 hours to prepare beta alumina and/or β" alumina powder raw materials. Then, using a powder drier, the beta alumina and/or β" alumina powder raw materials were further crushed into powders with a size of 40 to 60 μm which were, in turn, molded in a cold isostatic pressure molding machine under an isostatic pressure of about 55,000 psi. Thereafter, the molded bodies were sintered at a temperature given in the following Table 1 in a MgO crucible, to prepare solid electrolytes.

The solid electrolytes prepared were tested for flexural strength using four-point bending test and specific resistance. Further, bulk densities of the solid electrolytes were measured. The results are given as shown in the following Table 1.

EXAMPLES 2, 5, 8 and 10

Aluminum oxide powders, $Na_2O$ powders, and MgO or $Li_2O$ powders were mixed with one another in amounts listed in the following Table 1. These mixtures were calcined in the same manner as that of Example 1. Following completion of the calcination, $WO_3$ powders were added in amounts indicated in Table 1, to obtain beta alumina and/or β" alumina powder raw materials which were then crushed in a powder drier into powders with desired sizes. Subsequent steps were taken in the same way as those of Example 1, so as to prepare solid electrolytes.

As to the prepared solid electrolytes, a bulk density as well as flexural strength using four-point bending test and specific resistance was measured and the results are given as shown in Table 1.

In the above Examples, the bulk density of the solid electrolyte was measured by using the Archimedean principle, according to ASTM C 373-72. With regard to the specific resistance of the sintered body, it was measured at 330° C. by a complex impedance method using four terminals in which use was made of a mock primary cell employing $NaNO_3$-$NaNO_2$ eutectic salts as electrodes.

test is 160 MPa or more and the specific resistance in a range of 2.7 to 3.7 Ωcm.

Figure 3:
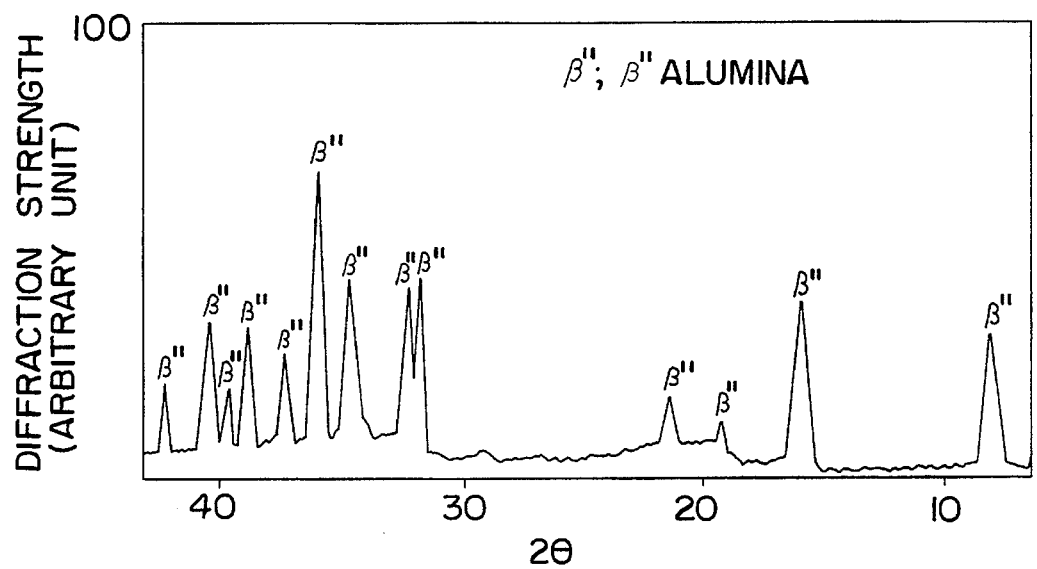
FIG. 3 is an X-ray diffraction spectrum of a sintered body of Example 6.

Referring to FIG. 3, there is shown an X-ray diffraction spectrum of the sintered body according to Example 6. As evident in this figure, there is no a secondary phase which might be believed to occur due to the addition of $WO_3$.

Figure 4:
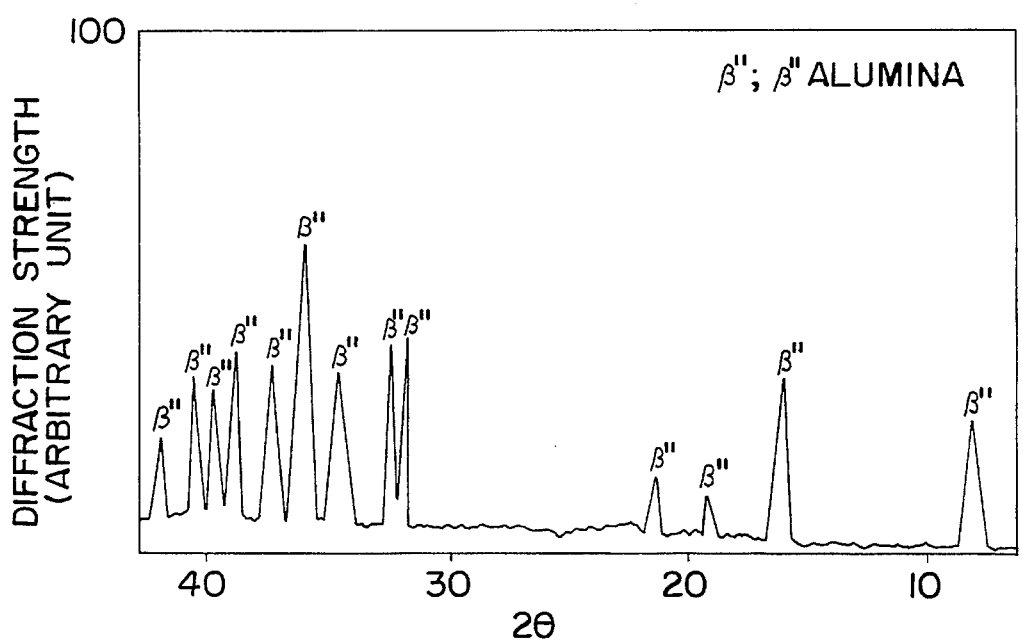
FIG. 4 is an X-ray diffraction spectrum of a sintered body of Example 8.

Referring to FIG. 4, there is shown an X-ray diffraction spectrum of the sintered body according to Example 8. Also, there is found out the absence of the secondary phase.

Figure 5:
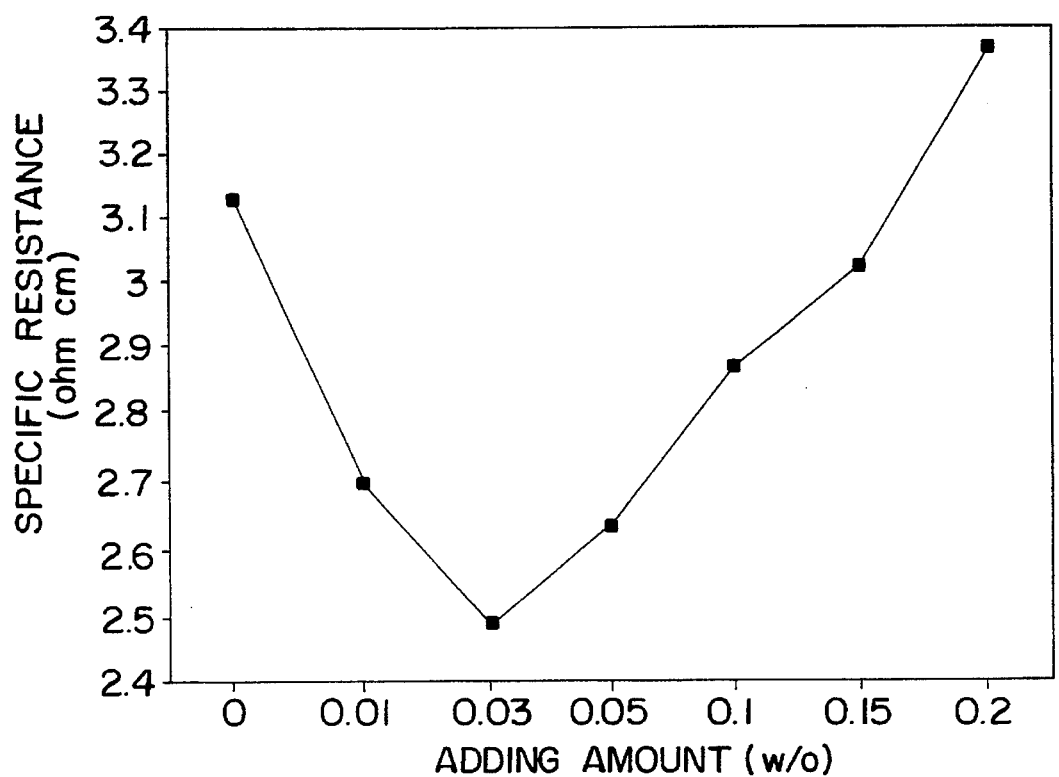
FIG. 5 show the relation between ion conductivity and adding amount of $WO_3$ at 350° C.

Turning now to FIG. 5, there is plotted the specific resistance as to the adding amount of $WO_3$ under the condition that the sintering temperature is fixed at 1,640° C. As shown in this figure, when $WO_3$ was added in an amount of 0.03 weight percent, the specific resistance was lowest. Such ion conductivity was obtained under the exclusion of fineness affect according to the sintering temperature and under the addition of MgO as a stabilizer for β" alumina phase.

Hereinbefore, although the solid electrolyte according to the present invention is described for limited uses for convenience, it should be noted that it can be applied for various fields without the limitation.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

The expression "consisting essentially of" as used in this specification excludes any unrecited substance at a concentration sufficient to substantially adversely affect the essential properties and characteristics of the compositions of matter being defined while permitting the presence of one or more unrecited substances at concentrations insufficient to substantially adversely affect said essential properties and characteristics.

What is claimed is:

1. A solid electrolyte for sodium-sulfur secondary cell, comprising a composition consisting essentially of 7.0 to 10.0 weight percent of $Na_2O$, 0.5 to 3.5 weight percent of MgO or 0.7 to 1.0 weight percent of $Li_2O$, 0.01 to 0.6 weight percent of $WO_3$, and the balance of $Al_2O_3$.

TABLE 1

| Exam. No. | $Na_2O$ weight percent | MgO weight percent | $Li_2O$ weight percent | $WO_3$ weight percent | $Al_2O_3$ weight percent | Sinter Temp. (°C.) | Bulk Density (g/cm³) | Flexural Strength (MPa) | Specific Resist. (330° C., Ω cm) |
|---|---|---|---|---|---|---|---|---|---|
| 1 | 8.9 | 2.5 | — | 0.1 | balance | 1620 | 3.13 | 170 | 3.1 |
| 2 | 8.7 | 4.0 | — | 0.1 | balance | 1640 | 3.21 | 213 | 2.9 |
| 3 | 9.2 | 3.8 | — | 0.05 | balance | 1620 | 3.19 | 207 | 2.8 |
| 4 | 9.7 | 2.9 | — | 0.02 | balance | 1620 | 3.23 | 220 | 2.7 |
| 5 | 9.5 | 3.3 | — | 0.02 | balance | 1620 | 3.24 | 230 | 2.5 |
| 6 | 9.7 | 2.8 | — | 0.03 | balance | 1620 | 3.19 | 213 | 2.6 |
| 7 | 9.6 | 2.7 | — | 0.05 | balance | 1620 | 3.18 | 195 | 2.9 |
| 8 | 8.5 | — | 0.7 | 0.03 | balance | 1600 | 3.18 | 199 | 2.8 |
| 9 | 8.7 | — | 0.5 | 0.4 | balance | 1660 | 3.10 | 167 | 3.4 |
| 10 | 8.9 | — | 0.4 | 0.01 | balance | 1600 | 3.15 | 184 | 3.0 |
| 11 | 8.9 | — | 0.3 | 0.1 | balance | 1640 | 3.19 | 216 | 2.9 |
| 12 | 8.4 | — | 0.7 | 0.1 | balance | 1640 | 3.18 | 191 | 3.0 |
| 13 | 8.4 | — | 0.7 | 0.2 | balance | 1620 | 3.21 | 225 | 2.7 |

From the Table 1, it is apparent that each sintered body according to the present invention, which sintered at various temperatures ranging from 1,600° to 1,660° C., has its characteristics such that the bulk density is in a range of 3.10 to 3.25 g/cm³, the flexural strength using four-point bending 2. A solid electrolyte composition for a sodium-sulfur secondary cell consisting essentially of, by weight, 7.0 to 10.0 parts of $Na_2O$, 0.5 to 3.5 parts MgO or 0.7 to 1.0 parts $Li_2O$, 0.01 to 0.6 parts $WO_3$, and the balance $Al_2O_3$.

* * * * *